Sept. 2, 1952 S. CSENCSICS 2,608,699
TAPPING MACHINE
Filed July 19, 1948 2 SHEETS—SHEET 1

INVENTOR.
Steve Csencsics
BY
Florian G. Miller
Atty.

Sept. 2, 1952   S. CSENCSICS   2,608,699
TAPPING MACHINE

Filed July 19, 1948   2 SHEETS—SHEET 2

INVENTOR.
Steve Csencsics
BY
Florian G. Miller
Atty.

Patented Sept. 2, 1952

2,608,699

UNITED STATES PATENT OFFICE 2,608,699

TAPPING MACHINE

Steve Csencsics, Erie, Pa.

Application July 19, 1948, Serial No. 39,531

1 Claim. (Cl. 10—136)

This invention relates generally to machines having a spindle adapted to reverse its rotation upon a predetermined longitudinal movement thereof and more particularly to machines for forming screw threads such as a tapping machine.

Tapping machines for forming threads now on the market provide comparatively rough threads and the means of reversing the spindle of the machine is unsatisfactory. Many of these tapping devices only provide for a small area of the disk in frictional contact with the driving members thereby making slipping thereof a frequent occurrence and only very light work can be performed on such a machine. In other instances, it is necessary to pull the lever of a machine to manually move the spindle and clutch member thereon upwardly and downwardly into engagement with the opposing, oppositely rotating, driving members. There is a high inertia of parts in these prior machines which causes snapping of taps and dies. Many of these machines require the movement of the table under the spindle for operation. Others require lugs and stops which cause a violent engagement between rotating members thereby making them insensitive and causing breakage and damage of taps and uneven threads. All of these prior devices require a skillful operator to form a passable thread. These prior devices are insensitive, complicated, and costly.

It is accordingly an object of my invention to provide a machine having a spindle adapted for reversible operation which overcomes the above and other defects in such machines and it is more particularly an object of my invention to provide such a machine which is simple in construction, economical in cost, economical in manufacture, and efficient and simple in operation.

Another object of my invention is to provide a machine having a reversible spindle which has a low inertia constant to prevent tool breakage.

Another object of my invention is to provide a machine with a reversible spindle which is extremely sensitive to the application of pressure.

Another object of my invention is to provide a machine with a reversible spindle wherein the reversing movement is faster than the driving movement to quickly remove a tap or die.

Another object of my invention is to provide a machine having a reversible spindle which automatically reverses itself upon a predetermined movement of the spindle after engagement of a tap or die with the work piece.

Another object of my invention is to provide a machine having a reversible spindle which eliminates all lugs and stops and other devices causing violent impact action.

Another object of my invention is to provide a machine having a reversible spindle which very gradually overcomes the inertia of the spindle upon starting and reversing.

Another object of my invention is to provide a machine for cutting threads which automatically rotates the spindle and thread cutting member movable therewith in a clockwise direction upon engagement of the thread cutting member with a work piece and which automatically reverses the spindle upon a predetermined longitudinal movement of the thread cutting member into the work piece.

Other objects of my invention will become evident from the following detailed description, taken in conjunction with the accompanying drawings, in which Fig. 1 is a side elevational view with parts thereof broken away of my novel machine for cutting screw threads;

Figure 1:
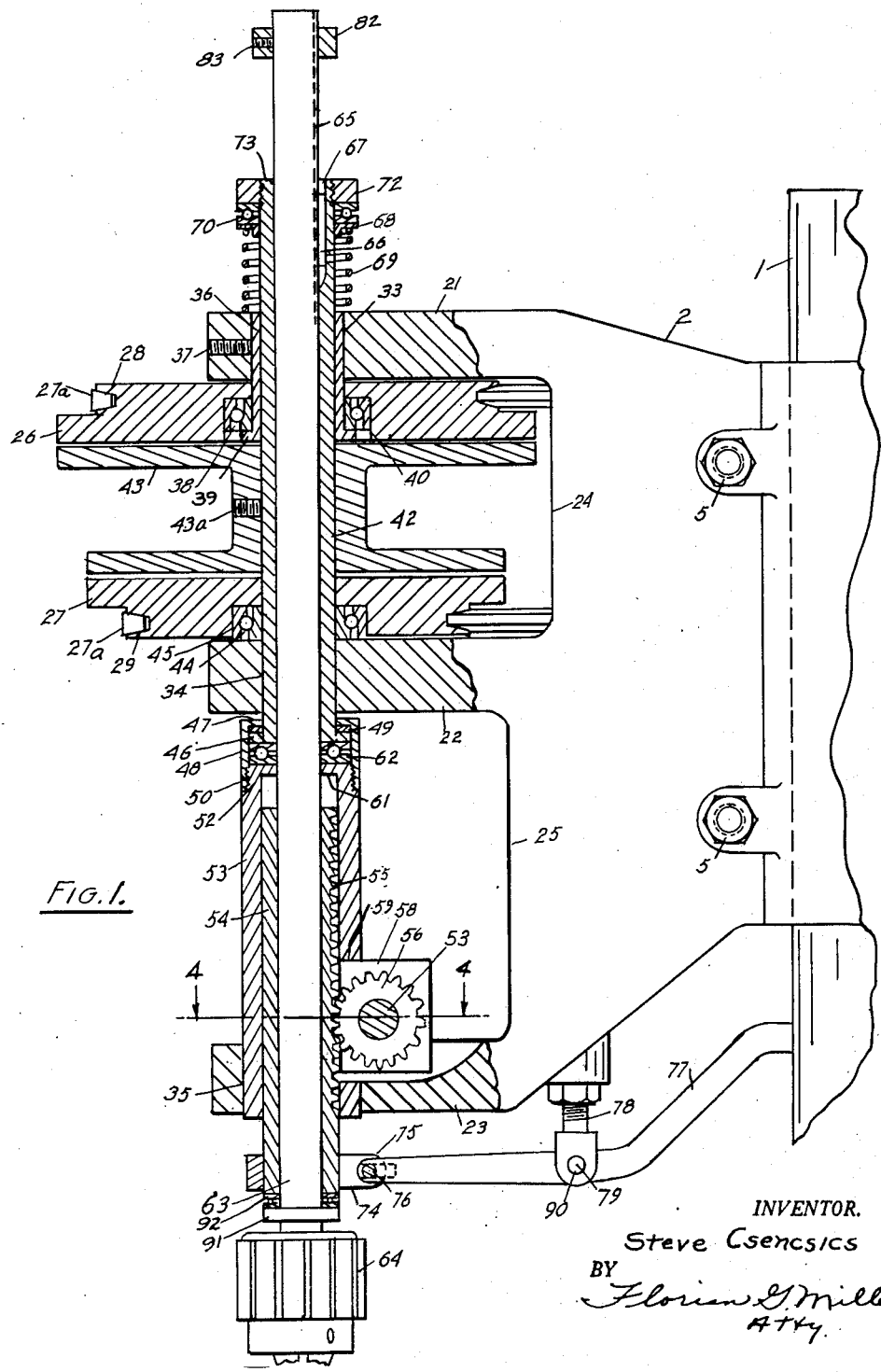
Figure 2:
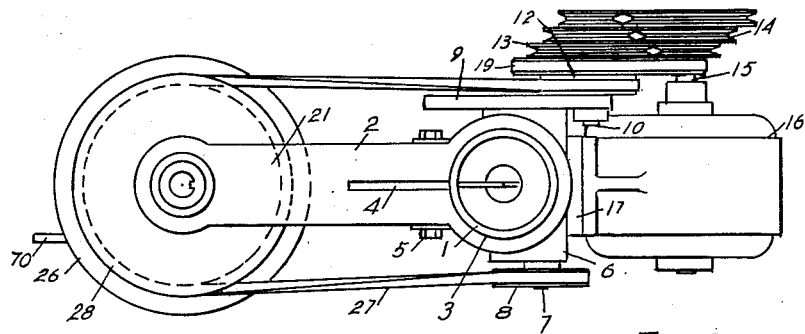
Fig. 2 is a plan view of my novel machine for cutting screw threads.
Figure 3:
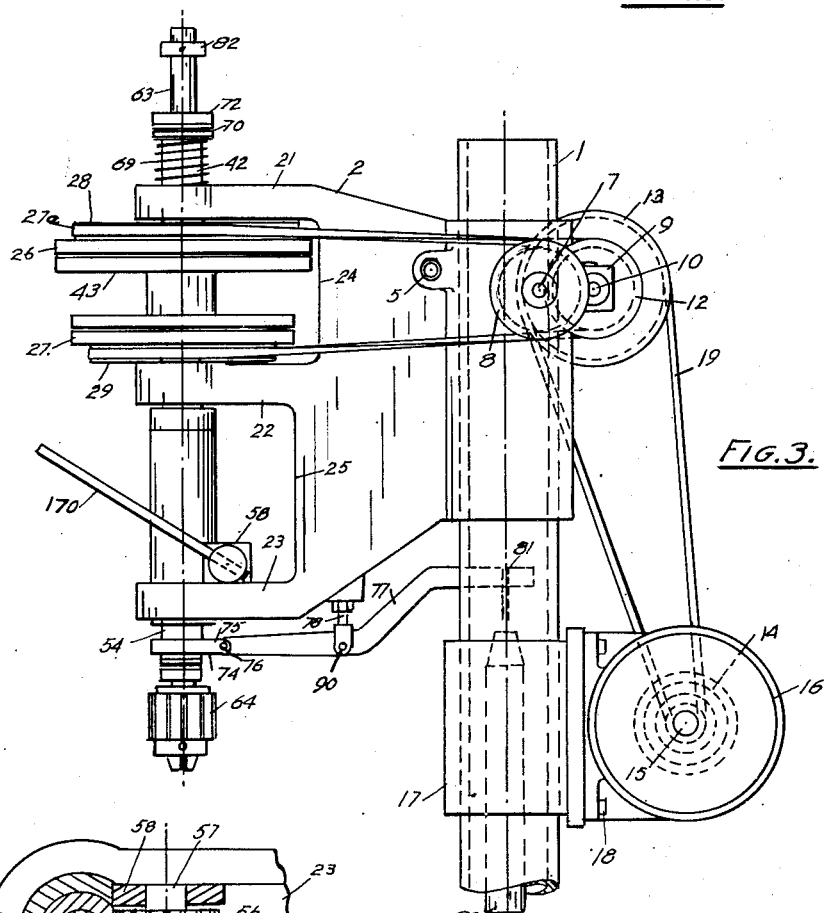
Fig. 3 is a side elevational view of my novel machine for cutting screw threads.
Figure 4:
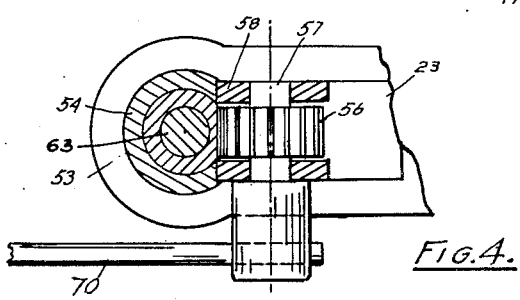
Fig. 4 is a view taken on the line 4—4 of Fig. 1.

Referring now to the drawings, I show in Figs. 1, 2, 3 and 4, a vertically extending, hollow, cylindrical support member 1 which may be supported on any suitable base mounted on a floor or a bench. A movable work table (not shown) is supported on the lower end of the support member 1. A head frame 2 has an aperture 3 formed on one end thereof for engagement with the hollow support member 1. A longitudinal slit 4 is formed in the frame 2 to permit the apertured portion 3 thereof to slide over the support member 1. Bolt and nut assemblies 5 extend transversely of the slit portion 4 of the frame 2 to secure it in any predetermined vertical position on the support member 1. The frame 2 has a transversely extending, apertured cylindrical portion 6 to journal a shaft 7 which has a pulley 8 mounted on one end thereof. An adjustable arm 9 is secured to the opposite side of the transverse portion 6 and it has a shaft 10 extending through one end thereof for mounting a pulley 12. A stepped pulley 13 is also mounted on the shaft 10 and it is opposed by a driving stepped pulley 14 on shaft 15 which is driven by a suitable electric motor 16. The electric motor 16 is mounted on the support member 1 by an an apertured support bracket 17 and machine bolts 18. A belt 19 is trained over the pulleys 13 and 14 to transfer rotative force therebetween.

The frame 2 has spaced, laterally extending apertured arms 21, 22, and 23, forming recessed portions 24 and 25. The recessed portion 24 has nested therein a driving disk 26 and an opposed driving disk 27 smaller in diameter. Pulleys 28 and 29 are formed integral with the disks 26 and 27 and an endless belt 27a is trained over the pulley 8, the pulleys 28 and 29, and the pulley 12 thereby causing the disk 26 to move in a direction reverse of that of the disk 27. The projecting arms 21, 22, and 23 have alined apertures 33, 34, and 35 therein. A flanged bushing 36 is disposed in the aperture 33 in the arm 21 and it is held in place by a lock screw 37. A thrust bearing 38 is disposed adjacent the flange 39 on the bushing 36 and it is also disposed in the recessed portion 40 of the disk member 26 thereby permitting the disk member 26 to rotate freely on the flanged portion 39 of the bushing 36. A hollow spindle 42 extends through the bushing 36 and through the aperture 34 in the arm 22. A double faced disk unit or clutch 43 is spaced from and disposed between the disk members 26 and 27 and it is fixed against rotation on the spindle 42 by a locking screw 43a. The disk member 27 is mounted on a bearing member 44 which is nested in a central recess 45 thereof and it engages the upper face of the arm 22. The spindle 42 and the double faced clutch member 43 are movable longitudinally so that the clutch member 43 may engage either of the disk members 26 or 27 alternately. The spindle 42 has an outwardly extending flange 46 on the lower end thereof and it engages the inwardly projecting flanged portion 47 of a cup shaped member 48 with a ring washer 49 disposed therebetween. The cup shaped member 47 has an inner threaded portion 50 for threadably engaging the reduced threaded end 52 of a stationary cylindrical member 53, the lower end of which is journalled in the aperture 35 in the arm 23. A sleeve 54 is telescopically disposed in the cylindrical member 53 and it has rack teeth 55 formed on one side thereof for engagement with a gear 56 mounted on a transverse shaft 57. Also mounted on the transverse shaft 57 is a rectangular block member 58 which is secured in a cut out portion 59 of the cylindrical member 53. The block member 58 may be secured by machine screws, spot welds, or any other suitable conventional means. The upper apertured end 61 of the member 53 engages a bearing assembly 62 which in turn engages the flanged end 47 of the rotatable sleeve 42. A handle 170 is attached to the shaft 57 for rotation thereof.

A chuck shaft 63 extends longitudinally through the rotatable sleeve 42 and the sleeve 53 and it has secured on the lower end thereof a chuck member 64 for receiving a tap or any other cutting tool. The shaft 63 has an annular flange 91 formed on the lower end thereof on which is disposed a bearing assembly 92 and the sleeve 54. It will be evident that a chuck for holding a die may be utilized instead of the chuck 64 without departing from my invention. The upper end of the shaft 63 has a keyway 65 for engaging a key 66 which in turn engages a keyway 67 in the upper end of the sleeve 42 so that the shaft 63 and the sleeve 42 rotate together but may move longitudinally relative to each other. A flanged collar 68 is disposed around the upper end of the sleeve 42 and it is spaced from the upper face of the arm 21 by a coil spring 69. A bearing assembly 70 is mounted on the flanged collar 68 and a threaded member 72 threadably engages the upper threaded end 73 of the sleeve 42 to secure the flanged collar 68 and the bearing assembly 70 in position on the upper end of the sleeve 42. A bracket 74 is secured to the lower end of the sleeve 54 and it has an outwardly extending slotted portion 75 connected by means of a pivot pin 76 to an offset lever 77 pivoted centrally thereof at 90 by an adjustable threaded bracket 78 and a transversely extending pin 79. A counterweight 80 is hung on the grooved portion 81 of the outer end of the arm 77. The counterweight 80 urges the sleeve 54 upwardly to a neutral position in the cylindrical member 53.

An annular stop member 82 is secured to the upper end of the shaft 63 by a lock nut 83 to adjustably limit the longitudinal movement of the shaft 63 and to cause the rotating spindle 42 and clutch member 43 to move downwardly therewith into engagement with the driving disk 27 thereby reversing the rotation of the spindle 42 and the shaft 63, when the tap or screw cutting member has moved longitudinally a predetermined amount.

In the operation of my machine, the double faced disk clutch 43 normally rides between the driving disks 26 and 27 and is sensitively balanced therebetween by the spring 69. In this neutral position, the spindle 42 and the shaft 63 remain at rest. Likewise, the counterweight 80 causes a sensitive balance of the sleeve 54 in the cylindrical member 53. Upon rotation of the handle 170, the shaft 57 and gear 56 thereon is rotated causing a downward movement of the sleeve 54 and the shaft 63 against the force of the counterweight 80. The shaft 63 and the sleeve 54 move downwardly until a tap or die (not shown) in the chuck 64 engage the work piece upon which a thread is to be formed. When the downward movement of the shaft 63 is stopped by the engagement of the tap with a work piece, the gear 56 moves upwardly on the rack teeth 55 of the sleeve 54 whereby the block member 58 being secured to cylindrical member 56 causes the cylindrical member 53 and the rotatable spindle 42 to move upwardly. The upper face of the double faced clutch 43 then engages the driving disk 26, which normally rotates in a clockwise direction, thereby rotating the spindle 42 and shaft 63 in a direction to cut the thread. Upon further rotation of the handle 170, the tap moves into the workpiece to cut the thread. The sleeve 54 and shaft 63 move longitudinally upon further rotation of the gear 56 after the clutch 43 and the driving disk 26 have been engaged. When the shaft 63 has moved downwardly a predetermined amount, the stop collar 82 engages the upper end of the spindle 42 to move it and the clutch 43 downwardly. This causes the lower face of the clutch member 43 to move downwardly into engagement with the reversing driving disk 27 thereby reversing the rotation of the tap to move it from the work piece. The reversing rotation is faster than the clockwise rotation used in cutting the thread because of the smaller pulley 29. The tap may be removed at any point in the cutting operation by reversing the rotation of the gear 56 through the handle 170 whereby the member 58 being secured to the member 53 causes the member 53, spindle 42, and clutch 43 to move downwardly to a position wherein the clutch 43 engages the reversing disk 27.

It will be evident from the foregoing description that I have provided a novel machine for forming screw threads in a work piece which has a low inertia constant to prevent tool breakage, which is extremely sensitive to the application of pressure, which has a minimum of tap and die breakage, which eliminates all violent impacts from the use of lugs and stops, and one which may be operated by an unskilled operator to form perfect threads.

Various changes may be made in the specific embodiment of my invention without departing from the spirit thereof or from the scope of the appended claim.

What I claim is:

In a machine tool, a support frame, a rotatable hollow spindle mounted on said frame and supported for axial movement adjacent each end thereof by spaced bearings, spaced disks rotatably mounted on said frame between said spaced bearings, a double faced clutch member disposed between said disks and adapted to selectively frictionally engage one of said disks, said clutch member being fixed to said hollow spindle and concentric therewith, means to bias said clutch member to a neutral position between said disks, means to rotate said disks in opposite directions, an axially aligned non-rotatable spindle attached to one end of said rotatable spindle, guide means fixed to said frame for said non-rotatable spindle, said guide means spaced from said spaced bearings, said non-rotatable spindle extending through said guide means, a rotatable shaft concentric with and slidable and rotatably associated with said rotatable spindle and extending through sadi non-rotatable spindle, a telescoping sleeve slidably mounted in said non-rotatable spindle and forming a bearing for said rotatable shaft, means to attach a tool to said rotatable shaft, and means on said non-rotatable spindle to move said sleeve and said spindle in opposite directions whereby said clutch is brought into engagement with one of said disks when a tool in said holding means contacts a fixed object.

STEVE CSENCSICS.

REFERENCES CITED

The following references are of record in the file of this patent:

UNITED STATES PATENTS

| Number | Name | Date |
| --- | --- | --- |
| 610,208 | Tuttle | Sept. 6, 1898 |
| 832,221 | Tuttle | Oct. 2, 1906 |
| 1,244,084 | Shafer | Oct. 23, 1917 |
| 1,459,981 | McClellan | June 26, 1923 |